INVENTOR.
ELVERTON W. WEAVER
BY
ATTORNEYS

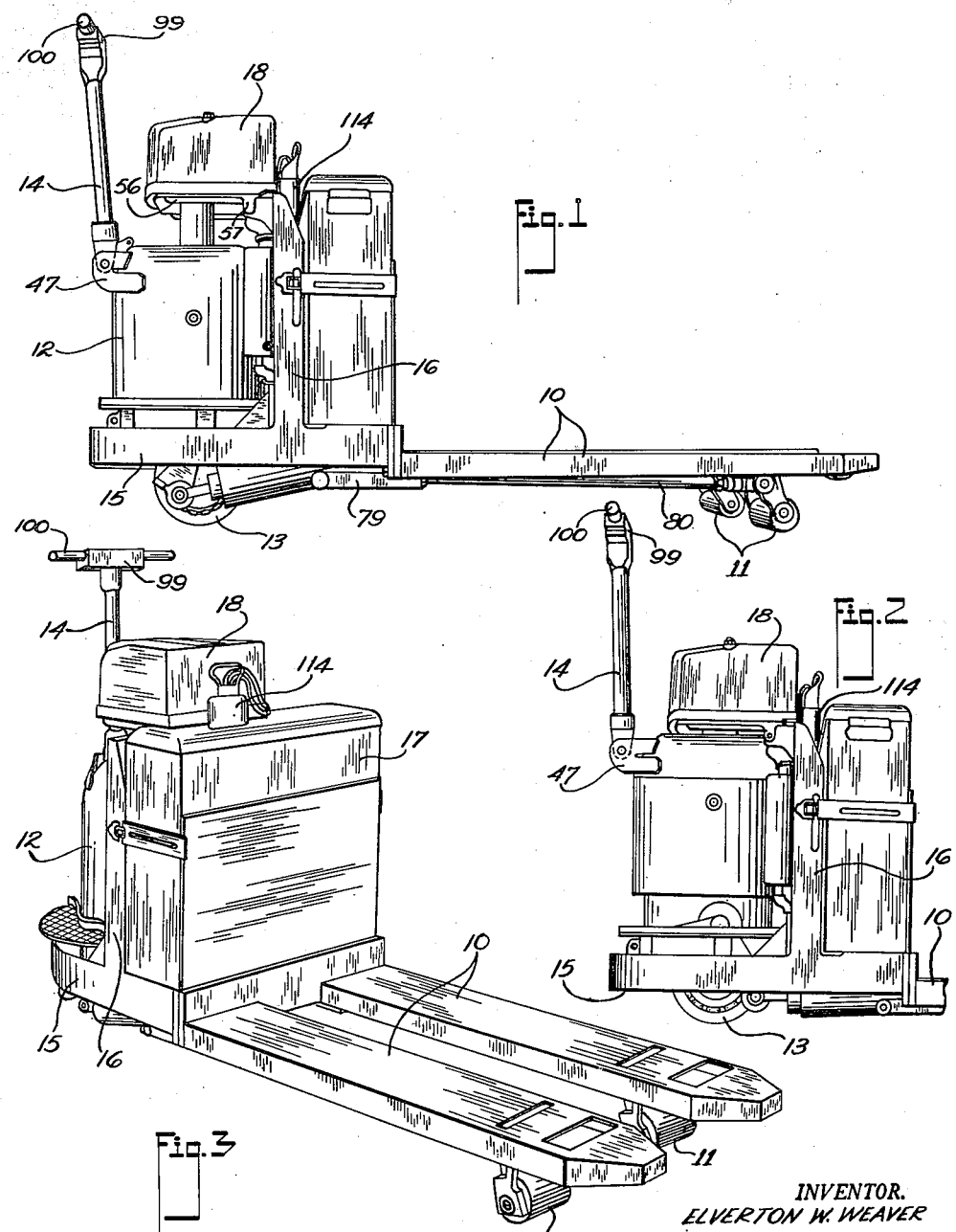

April 8, 1952     E. W. WEAVER     2,592,091
MOTORIZED HAND TRUCK
Filed Aug. 11, 1948     7 Sheets-Sheet 3
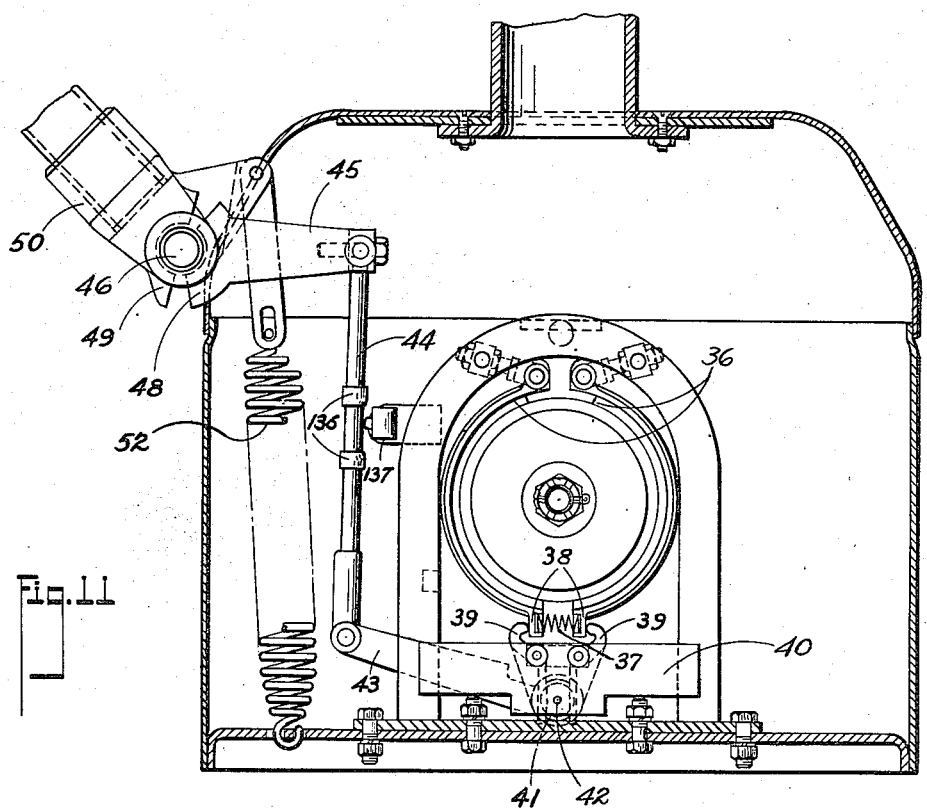
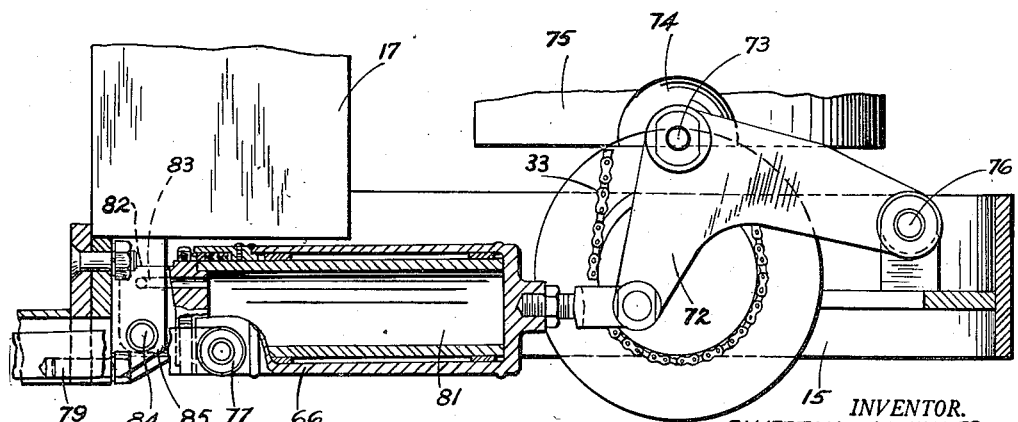
INVENTOR.
ELVERTON W. WEAVER
BY
ATTORNEYS

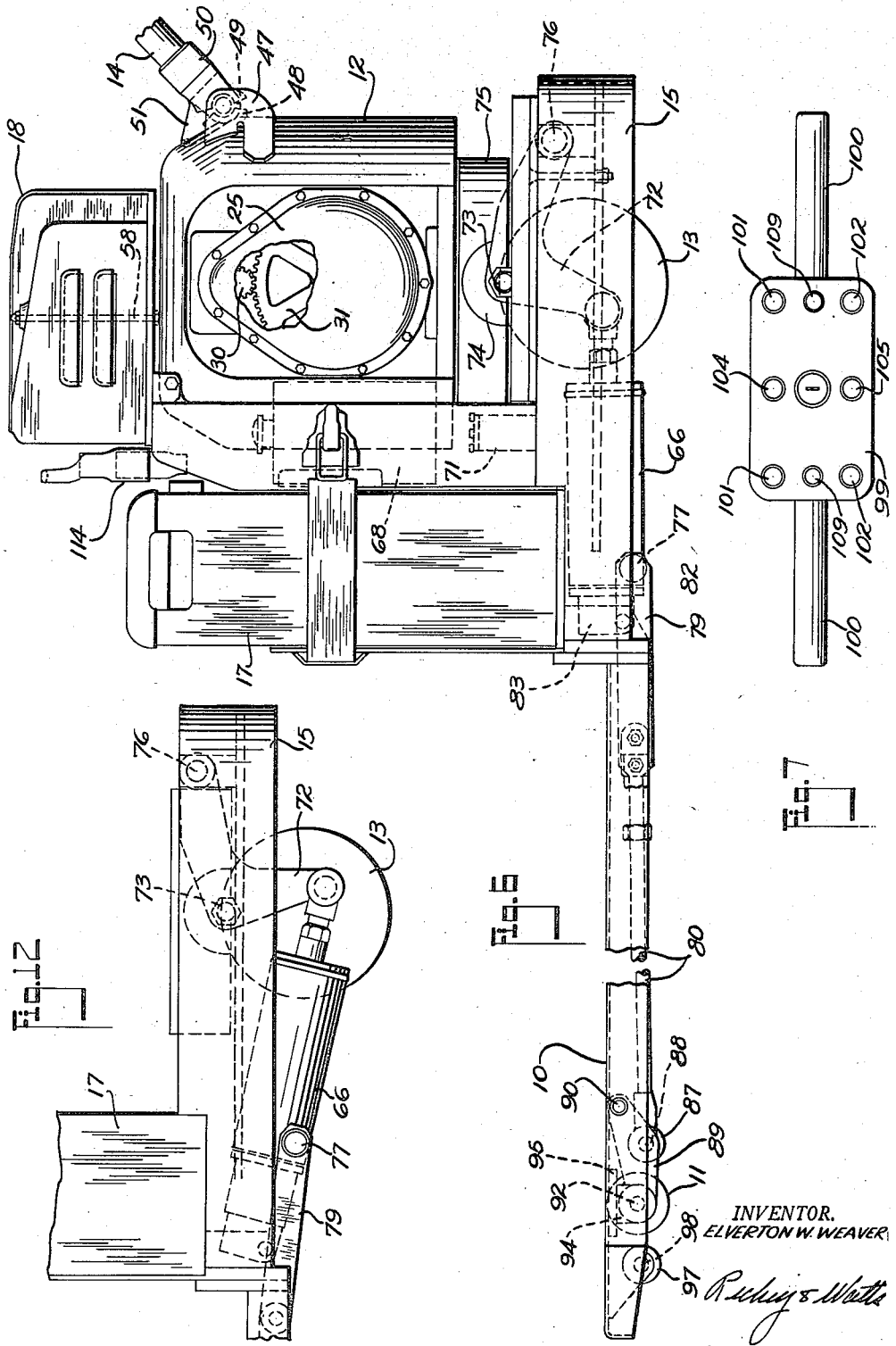

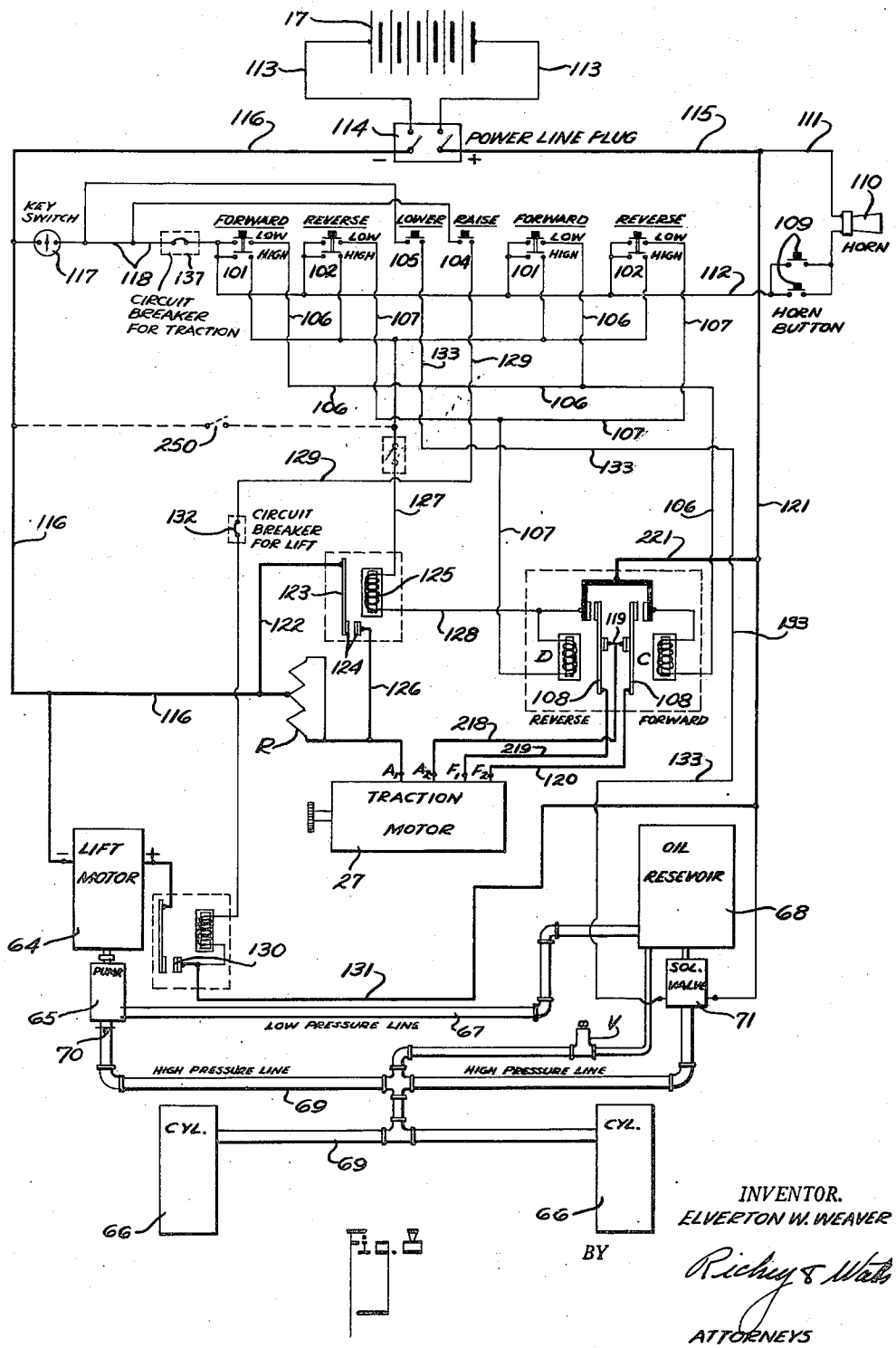

April 8, 1952 E. W. WEAVER 2,592,091
MOTORIZED HAND TRUCK
Filed Aug. 11, 1948 7 Sheets-Sheet 6
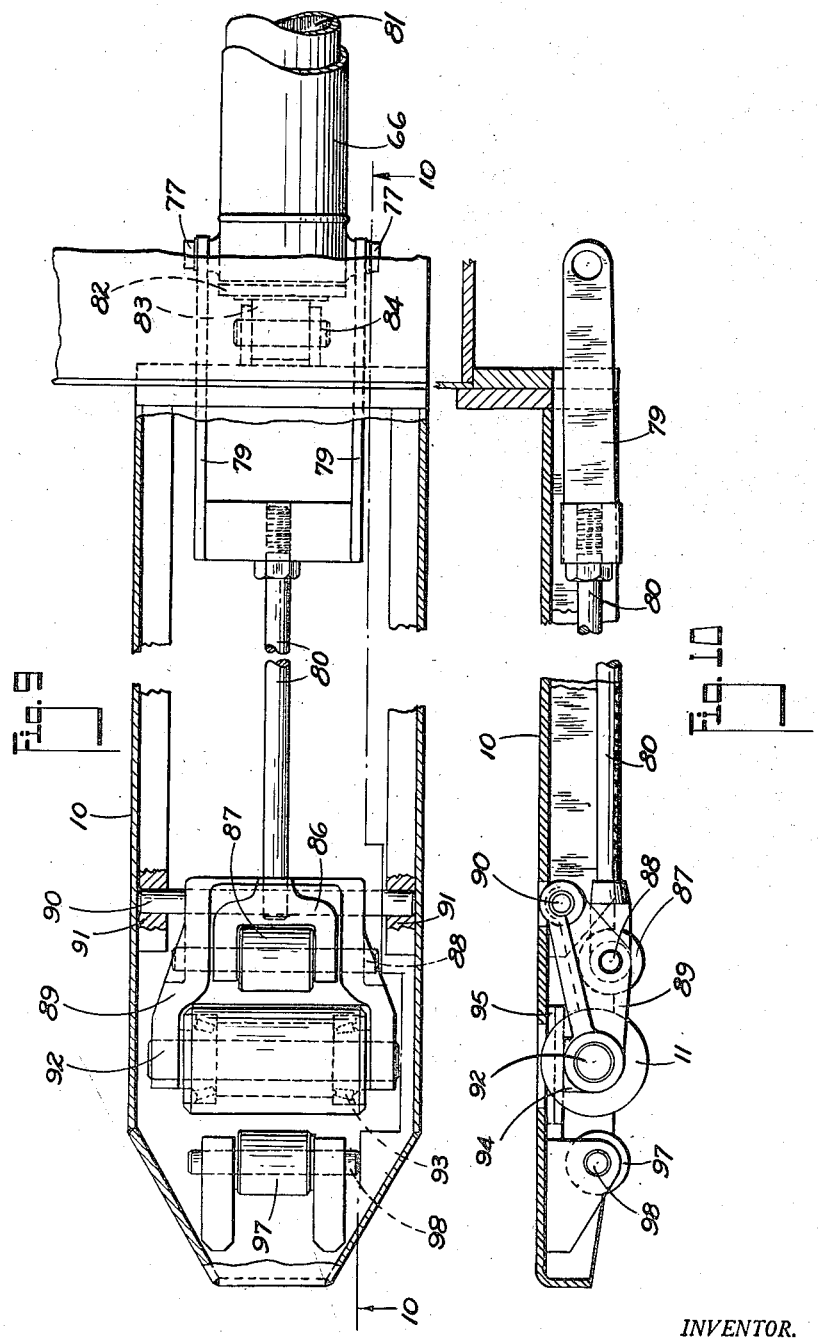
INVENTOR.
ELVERTON W. WEAVER
BY
ATTORNEYS

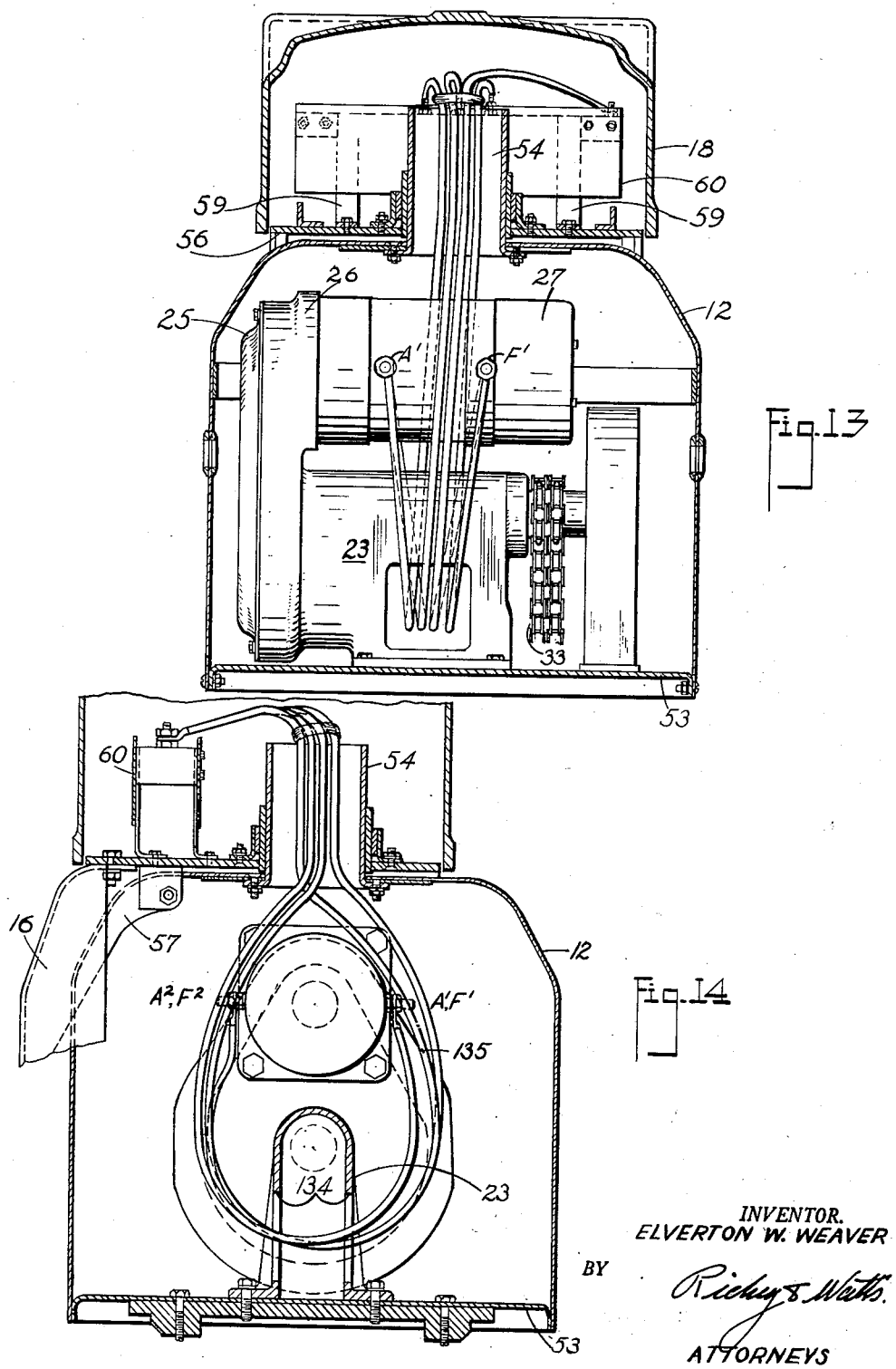

Patented Apr. 8, 1952

2,592,091

UNITED STATES PATENT OFFICE 2,592,091

MOTORIZED HAND TRUCK

Elverton W. Weaver, Cleveland, Ohio, assignor to Towmotor Corporation, Cleveland, Ohio, a corporation of Ohio Application August 11, 1948, Serial No. 43,751

11 Claims. (Cl. 180—13)

This invention relates broadly to hand trucks, and, more specifically, to improvements in power-driven lift trucks of the tongue and caster wheel type.

One of the objects of the invention resides in the provision of a load-carrying platform which is greater in length than the platform of similar trucks, now on the market, of the same over-all length.

Another object of the invention is to provide a vehicular chassis which is constructed for elevation independent of the caster wheel and power plant assembly.

Another object of the invention is to provide an automatic control unit to delimit the movement of the chassis-elevating mechanism.

Another object of the invention is to provide a brake mechanism which is designed to effect the application of braking effort upon the brake drum in response to the pressure imposed upon the tongue of the vehicle adjacent the end of the vertical throw thereof.

Another object of the invention is to provide an organization of electric switches in the tongue or handle cross bar and to arrange such switches for operation when, and only when, they are held in their closed position by the operator.

Further objects of the invention reside in the provision of a machine which is economic of manufacture, simple of structure, efficient of operation, and designed to minimize the physical effort customarily required of the operator in handling machines of this character.

Other objects and advantages more or less ancillary to the foregoing, and the manner in which all the various objects are realized, will appear in the following description, which, considered in connection with the accompanying drawings, sets forth the preferred embodiment of the invention.

Referring to the drawings:

Fig. 1 is a view in perspective of the improved truck illustrating the frame of the machine in its elevated position;

Fig. 2 is a similar view of a portion thereof illustrating the frame in its lowered position;

Fig. 3 is a view in perspective showing the configuration of the forks or load-carrying platform;

Fig. 5 is a detail view shown in section of the lift cylinder and associated parts;

Fig. 6 is a side elevational view of the machine, portions thereof being broken away in the interest of clarity;

Fig. 7 is a plan view of the handle crossbar, illustrating the arrangement of the electric control push buttons;

Fig. 8 is a wiring diagram and schematic view of the hydraulic system;

Fig. 9 is a longitudinal sectional view of one of the load-carrying forks;

Fig. 10 is a vertical sectional view thereof, the section being taken on a plane indicated by the line 10—10 in Fig. 9;

Fig. 11 is a vertical sectional view of the motor housing, illustrating the brake assembly;

Fig. 12 is an elevational view of a fragmentary portion of the chassis illustrating the lift cylinder and associated parts in their actuated position;

Fig. 13 is a vertical sectional view through the motor housing, illustrating the arrangement of the electrical cables for the drive motor; and Fig. 14 is a vertical sectional view through the motor housing taken on a plane normal to the section of Fig. 13.

Figure 4:
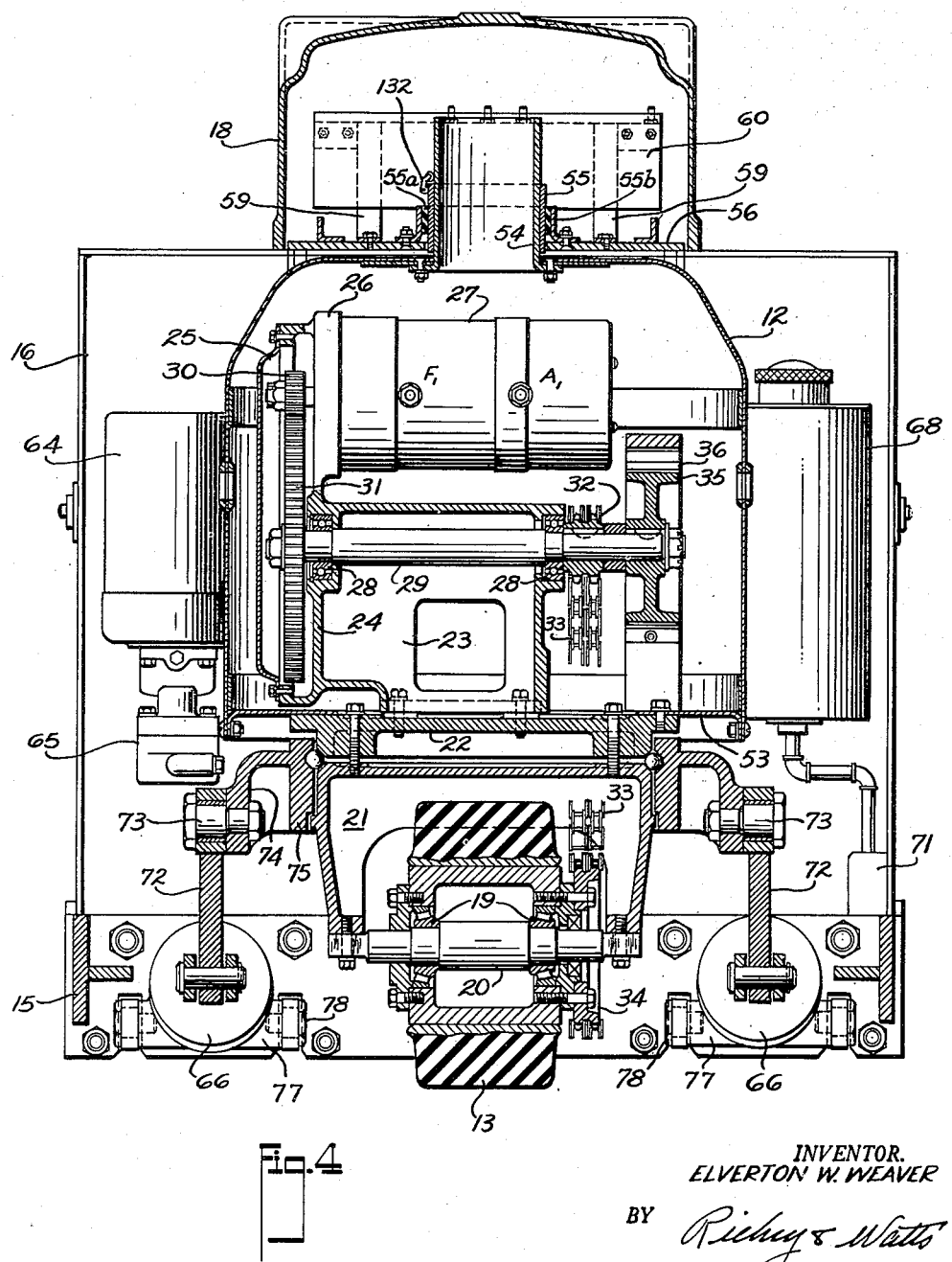
Fig. 4 is a vertical sectional view of the motor housing and caster wheel assembly.

Referring first to Fig. 1, the machine comprises generally a chassis or main frame including a load-carrying platform 10 supported on wheels 11, a sub-frame 12 including a motor housing, and mounting a power transmission assembly and a drive wheel 13. A tongue or handle 14 is provided for the control thereof.

In detail, the chassis comprises a pair of parallel rails or forks 10 (Fig. 3) and a frame portion 15 which is affixed thereto and formed to encircle the drive wheel and the base of the power transmission assembly. The chassis further includes a vertically disposed plate 16 mounted adjacent the inner ends of the forks and designed to support the battery 17 and provide a pilot bearing for the upper end of the motor housing of sub-frame 12.

As will be seen in Fig. 4, the drive wheel 13 is mounted on anti-friction bearings 19 supported on an axle 20 which is retained by a yoke 21 forming the supporting member for the motor transmission gearing and brake assembly. The yoke is bolted to a plate 22 having a bracket 23 secured thereon which is formed with a flanged end wall 24, defining a gear cage 25, and an opposed annular boss 26 machined for the support of an electric motor 27. The portion of the bracket adjacent the center of the gear cage 25 is of rectangular transverse section and formed with a pair of aligned journal bearings 28 for the reception of a countershaft 29. The motor is provided with a pinion 30 entrained with a gear 31 keyed to the end portion of the shaft 29 that protrudes into the gear cage 25. The opposed end of the shaft is provided with a sprocket 32 having a chain 33 thereon which is intergeared with a sprocket 34 secured to the drive wheel 13. The end of the shaft adjacent the sprocket 32 is provided with a brake drum 35 which, as shown in Fig. 11, is engaged by a pair of pivotally supported brake shoes 36 normally held in spaced relation with the drum by a compression spring 37 interposed between depending ears 38 on the free ends of the brake shoe segments. The outer faces of the ears 38 are engaged by levers 39 pivoted intermediate their ends upon a rail 40 anchored upon a U frame supported by the plate 22. The ends of the levers are engaged by a cam 41 mounted on a shaft 42 journaled in the rail 40 subjacent the fulcrums for the levers 39. The shaft for the cam 41 is keyed to an arm 43 which is pivotally coupled with a link 44 connected in turn to a lever 45 mounted on a shaft 46 journaled in brackets 47 (Fig. 6) mounted on the housing 12. The portion of the lever 45 adjacent its journal bearing is formed with a pair of opposed lugs 48 machined with radially disposed faces engageable with similar lugs 49 on the hub of a handle yoke 50. The yoke 50 is constructed with a bifurcated boss 51 for the support of a depending link which is fabricated to accommodate the retention of springs 52 normally urging the yoke to its elevated position. The center of the yoke is formed with a socket for the support of the handle 14. When the vehicle is in use the handle is lowered to a position where the lost motion mechanism or lugs 48 and 49 are disposed in spaced relation with each other and the lever 45 and associated parts are retained in the position in which the brake shoe segments clear the drum. When, however, the handle is depressed to the limit of its downward movement, or released and elevated by the springs 52 to its maximum upper position, the lugs 49 will engage the lugs 48 and rock the lever 45, thus causing the rotation of the cam 41 and consequent application of the brake.

Again referring to Fig. 4, the upper face of the plate 22 is provided with a ring 53 having a depending marginal flange thereon which is fabricated for the support of the housing 12. The housing is constructed with a tube 54 in the center of the upper end thereof which is machined for sliding engagement in a sleeve 55 mounted in a rubber bushing 55a retained by a collar 55b bolted on a shelf 56 constituting a portion of a bracket 57. The bracket is supported by the plate 16, the shelf portion 56 thereof being drilled and tapped for the reception of studs or cap screws 58 (Fig. 6) organized to effect the retention of the casing 18. The shelf is further provided with brackets 59 for the support of a switch panel 60 embodying the switches and automatic control instruments coupled with the electric motor 27. The panel 60 is also fabricated to accommodate the retention of contact switches organized for the control of a motor 64 coupled with a pump 65 that effects the circulation of pressure fluid to the lift cylinders 66. The motor 64 is mounted on the plate 16 adjacent the side wall of the housing 12 and the pump associated therewith is coupled through a conduit 67 (Fig. 8) with a reservoir 68 affixed to the plate 16 adjacent the opposed side of the housing. The pump is further coupled through conduits 69 with the lift cylinders 66, a check valve 70 being provided therein, adjacent the pump, to prevent the return flow of the fluid therethrough. The conduit system 69 is further provided with a spring-loaded relief valve V designed to bypass the fluid when the line pressure in the hydraulic system reaches a value concomitant the safe loading limit of the machine. A solenoid valve 71 is interposed in the line 69 adjacent the reservoir 68 to control the flow of the fluid displaced from the cylinders during the portion of the operative cycle in which the platform is lowered. The cylinders are fulcrumed adjacent their outer ends upon the depending arms of bell cranks 72 pivoted intermediate their ends upon shouldered cap screws 73 seated in brackets 74 formed in a turret ring 75 constituting a ball race of an antifriction bearing associated with the yoke 21 and plate 22. The opposed ends of the bell cranks 72 are pivoted on pintles 76 mounted in brackets welded or otherwise secured to the chassis frame 15. The inner ends of the cylinders 66 are formed with laterally disposed bosses 77 which constitute the fulcrums for yokes 79 secured to pull rods 80 for operating the elevating mechanisms in the outer end of the chassis 10. Each cylinder 66, as will be seen in Fig. 5, is provided with a hollow piston 81 provided at its outer end with a cap 82 having a packing gland thereon to seal the end of the cylinder. The cap is formed with a drilled opening 83 for the admission of pressure fluid to the interior of the piston and is also cross drilled to receive a pivot pin 84 seated in a bracket 85 affixed to the frame 15. Thus, as pressure fluid is admitted into the cylinder through the cap 82 the cylinder will move outwardly and effect the elevation of the chassis frame 15 (Fig. 12) as the bell crank 72 rocks about its fulcrum 73.

The outer end of each pull rod 80 is provided with a yoke 86 formed to span a roller 87 mounted on a pin 88 journaled in the arms of the yoke and aligned openings in the arms of a bifurcated bell crank 89. The inner end of the bell crank is fulcrumed on a pin 90 seated in bearing plates 91 affixed upon the inner face of the channel rails that constitute the tines of the fork or load-carrying platform 10. The outer ends of the arms of the bell crank 89 are drilled to receive an axle shaft 92 having anti-friction bearings 93 thereon for the support of the wheel 11. The upper face of each arm of the bell crank 89 is formed with a boss 94 thereon adapted for abutting engagement with a buffer block 95 secured to the inner face of the web of the channel rail 10. The bosses 94 limit the downward movement of the rail 10 when the cylinder is in its retracted position. When pressure fluid is admitted to the cylinders between the closed ends thereof and the pistons 81, the cylinders will move outwardly and effect the retraction of the pull rod 80, the consequent oscillation of the bell cranks 89, the simultaneous movement of the bell cranks 72, and the uniform elevation of both ends of the chassis 10. Each rail of the load-carrying platform 10 is provided with a roller 97 mounted on a pin 98 retained in a bracket secured to the inner face of the channel rail 11 adjacent the end thereof. These rollers, as well as the rollers 87, are disposed above the point of contact of the wheel 11 with the floor, and are proportioned to serve as buffers when the vehicle negotiates sharply inclined undulations in the floor, and across the bottom plate of a pallet as the truck forks are inserted and withdrawn therefrom.

The motors for the propulsion of the vehicle and the circulation of the pressure fluid to the lift cylinders are controlled through electric switches mounted in a control panel 99 in the central portion of the cross arm 100 of the handle 14 (Fig. 7). The switches, as will be seen in Fig. 8, are of the push button spring-load type and arranged in pairs with the forward, high- and low-speed travel switch 101 disposed in superposed relation with the reverse high and low switch 102. The switches are provided in duplicate, a pair of the switch buttons 101 and 102 being mounted at each end of the panel 99 adjacent the hand grip portions of the cross arm 100. The switches for the control of the elevating mechanism are mounted in the center of the panel 99, the upper switch 104 being connected to the contact element that operates the motor 64 to effect the elevation of the chassis while the lower switch 105 is connected with the solenoid valve 71 that effects the drainage of the lift cylinders and consequent retraction of the chassis. The switches 101 and 102 are constructed with dual contacts disposed in spaced relation so that the switch plunger will override the low-speed contact pole before it reaches the high-speed contact. The switches are further constructed with compression springs therein which normally urge the plungers out of engagement with the contacts so that the circuits to the respective control elements are closed when, and only when, the push buttons are depressed. The motor 27 is of the reversible type, the contacts for the buttons 101 and 102 being connected through lines 106 and 107 to an electro-magnetic switch 108 which is coupled with the motor to control the directional rotation thereof. The vehicle may be equipped with an electric horn controlled from a pair of push button switches 109 mounted on the panel 99 intermediate the push buttons 101 and 102 and coupled with the battery 17 and horn 110 through the lines 111 and 112.

The battery cables 113 are mounted in a plug 114 engaged in a socket wired in the service lines 115 and 116, the circuit therethrough being controlled by a key switch 117 interposed in a branch line 118 leading from the line 116, as illustrated in Fig. 8.

The speed of the motor 27 is regulated by the double contact switches 101 and 102, the upper or low-speed contact for forward drive being connected through the line 106 to a coil C which, when energized by operation of the switch 101, closes the electro-magnetic switch 108 and thereby connects the motor to the power line 116 through a resistance coil R. The circuit thus carried to the motor flows through the armature A¹, thence through the contact A², through a line 218 to a contact 119 in the electro-magnetic switch 108, through a line 219 to a field-winding F¹, through this winding to the contact F² and a line 120 coupled with the switch 108, then through a line 221 connected to the line 121 that leads to the battery. Reverse low-speed drive is effected in the same manner as that described above, save that the current will flow from the switch 102 through the line 107 and energize a coil D thereby reversing the flow of the current through the field-winding in the motor relative to the armature. The lower or high-speed contacts in the switches 101 and 102 are connected through the line 116 to a line 122 that leads to an electro-magnetic switch 123 embodying a contact 124 which, when biased by the magnet 125, causes the current to flow through a line 126, bypassing the resistance R, to the motor. The magnet 125 is excited by the current flowing through the line 127 and the line 128 that leads to the switch 108, then through the contacts therein in the manner heretofore described and to the line 121 to the battery. Reverse high-speed drive is effected in the same manner when the current from the line 116 flows through the line 122, through the switch contact 124, while biased by the magnet 125 to cause the current to flow to the line 126, through the motor and through the reverse contact element 119 in the switch 108, then through the line 121.

The switch 104 that controls the elevation of the chassis is connected to a line 129 that leads to an electro-magnetic switch 130 which closes the circuit to the lift motor 64. The circuit is completed from the line 116 through the motor and switch 130 by a line 131 that leads therefrom to the battery line 121. The control line 129 is interrupted by a circuit breaker 132 associated with the tube 54 and the sleeve 55 (Fig. 4) which is adapted to break the circuit to the coil 130 when the sleeve reaches a predetermined height. The switch 105 that controls the descent of the chassis is connected to a line 133 that leads to the solenoid valve 71 (Fig. 4) that effects the drainage of the cylinders 66. The circuit to the solenoid is completed by the battery line 121.

The cables from the switches and control instruments on the panel 60 are carried through the tube 54, through openings 134 in the bracket 23 and thence to the terminals A₁, A₂, F₁, and F₂ on the motor 27. As pointed out above, the motor is carried by the turret and is therefore subject to rotative movement relative to the switches and instruments on the panel 60. Moreover, the panel 60 on the shelf 56 is carried by the chassis 15 which is subject to vertical reciprocation relative to the motor 27. Hence, in order to compensate for the movement between the motor and the electric control instruments, the cables are formed with generous loops 135 intermediate the terminals to prevent undue tension thereon when the chassis is elevated and to avoid entanglement thereof as the turret is rotated.

In operation, the forward translation of the vehicle is effected by the operation of the low-speed switch 101 and subsequent adjustment thereof, if desired, to the high-speed contact. Obviously, when the vehicle is maneuvered for adjustment relative to the load, the low-speed drive is adequate. When the truck forks are positioned under a pallet the lift button 104 may be actuated to effect the elevation of the chassis. The descent of the chassis is controlled by manipulation of the switch 105. In the event it is desired to reverse the direction of the vehicle while in transit, the operator may effect such directional change by actuation of the reverse switch 102, the electro-magnetic switch 108 being organized as heretofore described to cause the automatic reversal of the motor.

If desired, a speed selector switch of any well-known type may be used in conjunction with the push button switches heretofore described. In such event a speed selector switch 250, as indicated in dotted lines in Fig. 8, would function to operate the magnet 125 and eliminate the high-speed switches or, if wired for use in conjunction therewith, serve to facilitate the preselection thereof.

As will be seen in Fig. 11, the link 44 is provided with a pair of collars or cams 136 disposed in spaced relation with a push button switch 137 to effect the operation thereof when the handle 14 is moved to the limit of its elevated or depressed adjustment. The switch or circuit breaker is connected to the line 118 (Fig. 8) and designed to open the circuit to the travel switches 101 and 102 when the handle is moved upwardly or downwardly to either of the brake-operating positions.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A hand truck comprising a chassis including a load-carrying platform, jack wheels supporting one end thereof, a subframe at the other end of said chassis, drive wheel means on said subframe, a drive motor on said subframe, drive gearing between said drive motor and drive wheel means, bracket means mounted on said chassis and having arm means extending over said subframe, bearing means between said arm means and subframe and arranged to provide for relative pivotal and reciprocating motion of said turret and arm means, motor means carried by said chassis, chassis support means vertically supported by said subframe and mounted for rotative movement relative thereto about a vertical axis, lever means connected to said lift motor means and to said chassis and fulcrumed to said chassis support means for the elevation or depression of said other end of said chassis, means connecting said motor means to said jack wheels for simultaneously raising and lowering said load-carrying platform and said one end of said chassis, and a control handle on said subframe.

2. A hand truck comprising a chassis including a load-carrying platform, jack wheels supporting one end thereof, a subframe at the other end of said chassis, drive wheel means on said subframe, a drive motor on said subframe, drive gearing between said drive motor and drive wheel means, bracket means mounted on said chassis forwardly of said subframe and having arm means extending over said subframe, bearing means between said arm means and subframe and arranged to provide for relative pivotal and reciprocating motion of said subframe and arm means, a pump carried by said chassis, driving mechanism therefor, hydraulic piston and cylinder means on said chassis and connected with said pump, chassis support means vertically supported by said subframe and mounted for pivotal movement relative thereto about a vertical axis, lever means connected to said hydraulic means and to said chassis and fulcrumed to said chassis support means for the elevation or depression of said other end of said chassis, means connecting said hydraulic means to said jack wheels for simultaneously raising and lowering said load-carrying platform and said one end of said chassis, and a control handle on said subframe.

3. A hand truck comprising a chassis including a load-carrying platform, jack wheels supporting one end thereof, a subframe at the other end of said chassis, drive wheel means on said subframe, a drive motor on said subframe, drive gearing between said drive motor and drive wheel means, bracket means mounted on said chassis and having arm means extending over said subframe, hollow bearing means between said arm means and subframe and arranged to provide for relative pivotal and reciprocating motion of said subframe and arm means, lift motor means carried by said chassis, chassis support means vertically supported by said subframe and mounted for pivotal movement relative thereto about a vertical axis, lever means connected to said lift motor means and to said chassis and fulcrumed to said chassis support means for the elevation or depression of said other end of said chassis, means connecting said lift motor means to said jack wheels for simultaneously raising and lowering said load-carrying platform and said one end of said chassis, a control handle on said subframe, a battery box mounted on said bracket means, a switch box on said arm means, battery cables extending from said drive motor through said hollow bearing means to said switch box, and cables connecting said switch box to said battery box.

4. A hand truck comprising a chassis including a load-carrying platform, jack wheels supporting one end thereof, subframe means at the other end of said chassis, drive wheel means on said subframe means, a motor supported on said subframe means, drive gearing between said motor and drive wheel means, bearing means between said chassis and subframe means and arranged to provide for relative universal swinging and sliding motion as well as relative rotative motion of said subframe means and chassis with said pivotal and sliding motion being about a substantially vertical axis, lift motor means carried by said chassis, chassis support means supported by said subframe means beneath said bearing means and mounted for pivotal movement relative thereto about said substantially vertical axis, lever means connected to said lift motor means and to said chassis and fulcrumed to said chassis support means for the elevation or depression of said other end of said chassis, and means connecting said lift motor means to said jack wheels for simultaneously raising and lowering said load-carrying platform and said one end of said chassis.

5. A hand truck comprising a chassis including a load-carrying platform, jack wheels supporting one end thereof, a subframe at the other end of said chassis, drive wheel means on said subframe, a drive motor on said subframe, drive gearing between said drive motor and drive wheel means, bracket means mounted on said chassis and having arm means extending over said subframe, bearing means between said arm means and subframe and arranged to provide for relative sliding motion as well as relative rotative motion of said subframe and arm means about a substantially vertical axis, lift motor means carried by said chassis, chassis support means supported by said subframe and mounted for pivotal movement relative thereto about said substantially vertical axis, lever means connected to said motor means and to said chassis and fulcrumed to said chassis support means for the elevation or depression of said other end of said chassis, means connecting said lift motor means to said jack wheels for simultaneously raising and lowering said load-carrying platform and said one end of said chassis, and a control handle an said subframe, said bearing means providing for inclination of the said axis of said turret and subframe assembly from the vertical in response to the action of said lever means.

6. A hand truck comprising a chassis including a load-carrying platform, jack wheels supporting one end thereof, a subframe at the other end of said chassis, drive wheel means on said subframe, a drive motor on said subframe, drive gearing between said drive motor and drive wheel means, bracket means mounted on said chassis and having arm means extending over said subframe, bearing means between said arm means and turret and arranged to provide for relative sliding motion as well as relative rotative motion of said subframe and arm means about a substantially vertical axis, lift motor means carried by said chassis, chassis support means supported by said subframe and mounted for pivotal movement relative thereto about said substantially vertical axis, lever means connected to said lift motor means and to said chassis and fulcrumed to said chassis support means for the elevation or depression of said other end of said chassis, means connecting said lift motor means to said jack wheels for simultaneously raising and lowering said load-carrying platform and said one end of said chassis, and a control handle on said subframe, said bearing means including a rubber bushing between said turret and arm means providing for inclination of the said axis of said subframe from the vertical in response to the action of said lever means.

7. A hand truck comprising a rigid main frame including a load-carrying platform, jack wheels supporting one end thereof, a subframe at the other end of said main frame and encircled thereby, drive wheel means on said subframe, a drive motor supported on said subframe, drive gearing between said drive motor and drive wheel means, motor means carried by said main frame, main frame support means mounted on said subframe for rotative movement relative to the latter about a vertical axis, laterally spaced lever means connected to said lift motor means and to said main frame and fulcrumed to each side of said main frame support means for the elevation or depression of the adjacent end of said main frame, a sliding bearing between said subframe and main frame on the axis of rotation of said support means, and means connecting said lift motor means to said jack wheels for simultaneously raising and lowering said load-carrying platform and said one end of said main frame.

8. A hand truck comprising a rigid main frame including a load-carrying platform, jack wheels supporting the front end thereof, a subframe at the rear end of said main frame and encircled thereby, drive wheel means on said subframe, a drive motor supported on said subframe, drive gearing between said drive motor and drive wheel means, lift motor means carried by said main frame, main frame support means mounted on said subframe for pivotal movement relative to the latter about a vertical axis, a bell crank having its intermediate portion pivoted to said main frame support means, one arm extending rearwardly from said pivot and pivoted at its end to said main frame rearward of said vertical axis, and another arm extending downwardly from said pivot and connected to said lift motor means for the elevation or depression of said rear end of said main frame, and means connected to said jack wheels for raising and lowering said load-carrying platform.

9. A hand truck comprising a chassis including a load-carrying platform, wheels supporting an end portion thereof, subframe means at the other end of said chassis including a drive wheel, a ring rotatably mounted on said subframe means, a pump carried by said chassis, mechanism for driving said pump, pistons mounted on said chassis, cylinders mounted thereon for reciprocative movement relative thereto, fluid connections between said pump and said cylinders, bell cranks fulcrumed to said ring and having generally vertical arms coupled with said cylinders and generally horizontal arms coupled to said chassis for raising and lowering the chassis, and a universal rotating, sliding, and swinging bearing means between said chassis and subframe means above said bell cranks.

10. A hand truck comprising a chassis having a load-carrying platform at one end, subframe means at the other end of said chassis, a drive wheel mounted on said sub-frame means, a support ring for said chassis mounted on said subframe means, anti-friction bearings between said ring and said subframe means providing for relative rotation of said ring and subframe means about a substantially vertical axis, a drive motor mounted on said subframe means, gearing intermediate said drive motor and said drive wheel, trunnions on said ring, bell cranks fulcrumed intermediate their ends to said trunnions with one arm thereof pivoted to said chassis, cylinders on said chassis pivotally connected to the other arms of said bell cranks, arms pivotally connected to said platform adjacent the end thereof opposite said subframe means, wheels mounted on the free ends of said arms, linkage connected to said arms intermediate their ends and connected to said cylinders, hydraulic means mounted on said platform for actuating said cylinders, said subframe means including a housing encasing said motor and gearing, a vertical partition on said platform adjacent said housing, a bracket on the upper end thereof overhanging said subframe means, a pilot bearing therein, and a tube on the upper face of said housing slidably engaged in said bearing.

11. A hand truck comprising a main frame including a load carrying platform, linkage on said platform mounting platform supporting wheels, a subframe with a drive wheel, annular means rotatably mounted on said subframe, linkage pivoted respectively to said main frame, said annular means and the linkage mounting said platform supporting wheels; hydraulic means connected to said linkage for rocking said linkage to move said platform supporting wheels in order to raise and lower said main frame, vertically extending means on said main frame having an extension disposed above said subframe, a bearing yieldably supported on said extension, and a guide member on said subframe slidably engaged in said yieldably supported bearing.

ELVERTON W. WEAVER.

REFERENCES CITED

The following references are of record in the file of this patent:

UNITED STATES PATENTS

| Number | Name | Date |
| --- | --- | --- |
| 2,114,157 | Towson | Apr. 12, 1938 |
| 2,234,925 | Hastings | Mar. 11, 1941 |
| 2,325,396 | Hastings | July 27, 1943 |
| 2,327,583 | Framhein | Aug. 24, 1943 |
| 2,395,345 | Schreck | Feb. 19, 1946 |
| 2,399,605 | Schroeder | Apr. 30, 1946 |
| 2,417,018 | Schroeder | Mar. 4, 1947 |
| 2,450,354 | Quayle | Sept. 28, 1948 |